(12) United States Patent  
Giorgis

(10) Patent No.: US 7,325,756 B1  
(45) Date of Patent: Feb. 5, 2008

(54) ROLL-SPRINKLER IRRIGATION SYSTEM

(76) Inventor: Getachew W. Giorgis, 7690 High Wind Dr., Powell, OH (US) 43065

( * ) Notice: Subject to any disclaimer, the term of this patent is extended or adjusted under 35 U.S.C. 154(b) by 0 days.

(21) Appl. No.: 11/469,933

(22) Filed: Sep. 5, 2006

(51) Int. Cl.
*B05B 3/18* (2006.01)
*B05B 7/26* (2006.01)
*B05B 1/14* (2006.01)

(52) U.S. Cl. ............... 239/727; 239/304; 239/310; 239/550; 239/726; 239/732; 239/735; 239/737

(58) Field of Classification Search ............ 239/727, 239/726, 732, 735, 737, 304, 310, 550, 722, 239/723, 728, 729, 730, 734, 743, 744, 754, 239/302, 303, 305, 548, 566
See application file for complete search history.

(56) References Cited

U.S. PATENT DOCUMENTS

| | | | | |
|---|---|---|---|---|
| 375,021 | A * | 12/1887 | Thompson | 239/723 |
| 2,692,163 | A * | 10/1954 | Geel | 239/754 |
| 2,712,960 | A * | 7/1955 | Grubb, Jr. | 239/723 |
| 3,202,362 | A * | 8/1965 | Wright | 239/754 |
| 4,022,382 | A * | 5/1977 | Engdahl, Jr. | 239/754 |
| 4,095,746 | A * | 6/1978 | Anderberg et al. | 239/754 |
| 4,200,236 | A * | 4/1980 | Briar | 15/361 |
| 4,580,726 | A * | 4/1986 | Unger | 239/722 |
| 4,638,948 | A * | 1/1987 | Marlek | 239/722 |
| 4,930,706 | A * | 6/1990 | Merlin | 239/754 |
| 5,908,163 | A * | 6/1999 | Wells | 239/722 |
| 6,131,832 | A * | 10/2000 | Murphy | 239/726 |
| 2005/0205698 | A1 * | 9/2005 | Knight et al. | 239/737 |

* cited by examiner

*Primary Examiner*—Darren Gorman  
(74) *Attorney, Agent, or Firm*—Lucas & Mercanti, LLP

(57) ABSTRACT

A roll-sprinkler system comprises with horizontal water conducting pipe portions as the supporting means for multiple wheels. The pipes conducting liquid to the sprinkler heads for irrigations have an opening adaptor allowing the system to connect with standard garden hose. The multi head sprinklers are mounted vertically to the horizontal pipes which are linked with wheels for easy displacing of the system during irrigation. The system may further comprise chemical tanks and valves controlling the tanks for adding chemicals into the irrigating water. The system may also be foldable or separable in two or three sections for shipping and storage. The system may further comprise a directional driving wheel, which is powered and can be programmed by an IC chip or controlled by a remote controller.

12 Claims, 5 Drawing Sheets

ROLL-SPRINKLER IRRIGATION SYSTEM

FIELD OF THE INVENTION

This invention relates in general to watering devices and, more particularly, to a roll-sprinkler irrigation system.

BACKGROUND OF THE INVENTION

Displaceable sprinkler systems are known in the art. Such systems can be used to irrigate land in various domestic, agricultural and other settings. Conventional sprinkling system with wheels commonly include the following components: a supporting frame with wheel(s), a water conduit supported by the frame and a sprinkler head.

In operation, the sprinkler assembly can be reeled out to a desired spot in a yard and set to sprinkle water. Water enters from the hose, through the routing pipe into the sprinkler and is discharged from the sprinkler head.

Some irrigation systems have complicated devices allowing the user to design a desired watering path and/or to adding chemicals to the water for farming irrigation. However, a sprinkler with these functions designed for domestic use as lawn irrigation or car washing is not widely available.

Previous roll sprinkling systems are limited because they are expensive, awkward to use, and can only be used as sprinklers for irrigation. Thus, there is a need for a movable sprinkler that are simple to use, economical to manufacture, convenient to store, and yet multifunctional for daily usage either in lawn irrigation or car washing.

SUMMARY OF THE INVENTION

This invention discloses a roll-sprinkler apparatus comprising, a horizontal water conducting pipe system having two pipe portions each having an inward end and an outward end; a horizontal T-shaped three-way connector having two through ends and a perpendicular end, connecting the two inward ends of the two pipe portions via its through-ends; an inlet adaptor connected to the perpendicular end of the horizontal T-shaped three-way connector for allowing the pipe system to link with a standard garden hose; two vertical T-shaped three-way connectors each having two through ends and a perpendicular end, each connected to one of the outward ends of the pipe portions via one of the through ends; two sprinkler heads each vertically connected to the perpendicular end of one of the vertical T-shaped three-way connectors; two horizontal connecting means which do not conduct water, each fixed to a remaining through-end of each vertical T-shaped three way connector; two wheels each connected to the pipe system along the horizontal axis by the two connecting means; and a horizontal platform plate with holes fixed to the horizontal T-shaped three-way connector, extending perpendicularly with respect to the pipe portion.

The apparatus may further has a separable configuration comprising two separable line couplers each linking the horizontal T-shaped three-way connector with the pipe portions. The apparatus may also be foldable, where the two connecting means for wheels can be folded.

The roll sprinkler may further comprise one or multiple chemical tanks mounted on the platform plate, each has a controlling valve system for the adding of specific chemicals to the irrigating water. In addition, the roll sprinkler can further include a car wash outlet for the easy application for car washing or waxing.

The roll-sprinkler apparatus may further include a driving wheel driven by a driving motor powered by a electric source. Further embodiments of the roll-sprinkler may include a directional wheel coupled with a directional motor controlled by a controlling module. The control can also be programmed or remotely controlled by user.

The roll-sprinkler apparatus may further include extended multiple pipe segments with additional sprinkler heads vertically connected to additional vertical T-shaped three-way connectors connecting those pipe segments.

DETAILED DESCRIPTION OF EMBODIMENTS OF THE INVENTION

The present invention relates to a roll sprinkler system that expands the range of possible uses for roll sprinklers. Embodiments of the invention will be explained in the context of one possible roll sprinkler assembly, but the detailed description is intended only as exemplary. Embodiments of the invention are shown in FIGS. 1-5, but the present invention is not limited to the illustrated structure or application.

Figure 1:
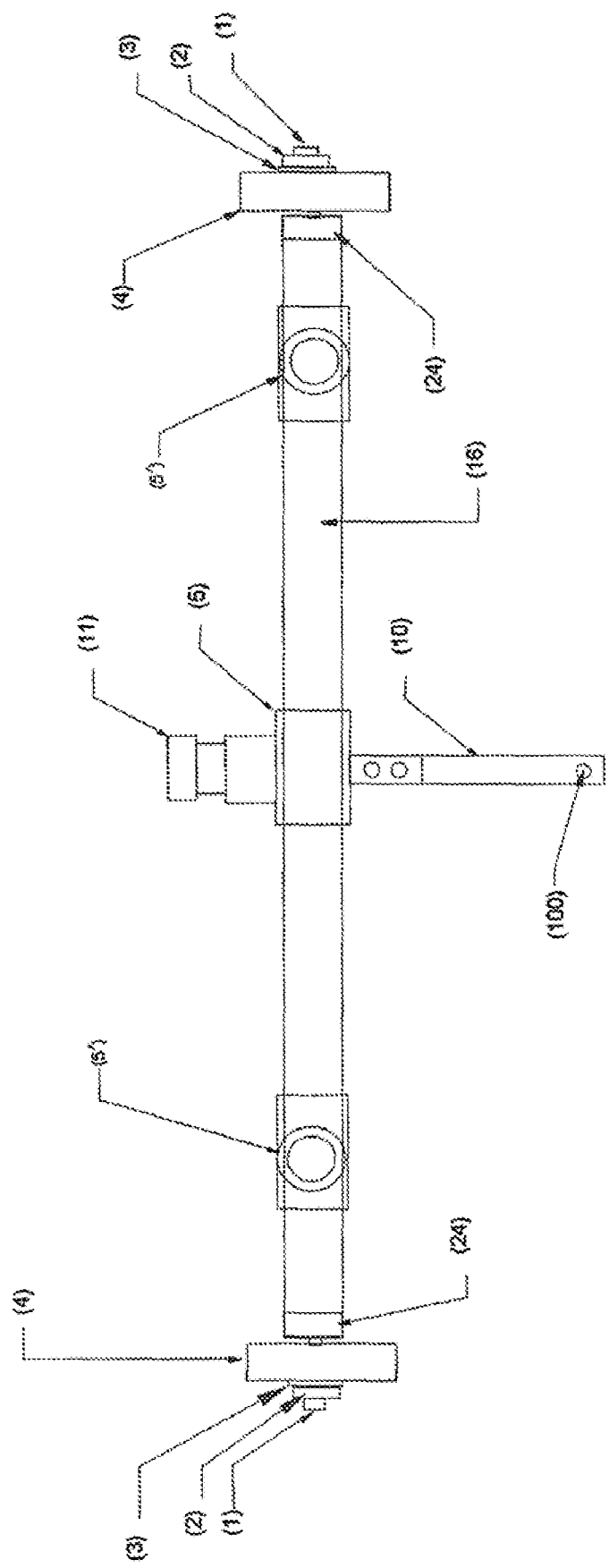
FIG. 1 is a vertical view of an embodiment of a roll sprinkler according to the invention.

FIG. 1 demonstrates a multi head sprinkler system comprising two horizontal water conducting pipes, a horizontal T-shaped three-way connector connecting the two pipe portions via its through-ends, an inlet adaptor connected to the horizontal T-shaped three-way connector for allowing the pipe system to link with a standard garden hose, two vertical T-shaped three-way connectors connecting the two pipe portions with two linking parts for two wheels, two sprinkler heads vertically connected to the vertical T-shaped three-way connectors and a horizontal platform plate with holes extending perpendicularly with respect to the pipe portion. The two horizontal linking parts, which do not conduct water, connect two wheels to the pipe system along the horizontal axis.

This embodiment is constructed with a horizontal galvanized pipe system. The horizontal pipe portion is linked with wheels for an easy way of displacing the system during irrigation. This horizontal water-conducting pipe system as the main frame has an advantage of the highest simplicity for a displaceable sprinkling apparatus. The structure basically transforms water pipes into a moving sprinkler system. By utilizing the horizontal water-conducting pipe as the supporting frame for the wheels and sprinkler heads, the structure is greatly simplified for the manufacturing process. The structure also gives more stability for the whole structure while in operation. Irrigating water goes via the T-shaped three-way connector directly to the horizontal pipe portions 16 to be delivered to the outlets 5 for sprinkler heads. Thus, the impact force of incoming water goes perpendicularly to the axis of the horizontal pipe portions as the supporting system of the whole structure. This design prevents the tip-over of the apparatus in the operation. The horizontal pipe design also produces a low standing structure for the easy placement under a vehicle for washing the base parts. The horizontal pipe frame facilitates easy storage and handling and gives the structure a neat looking appearance.

Figure 2:
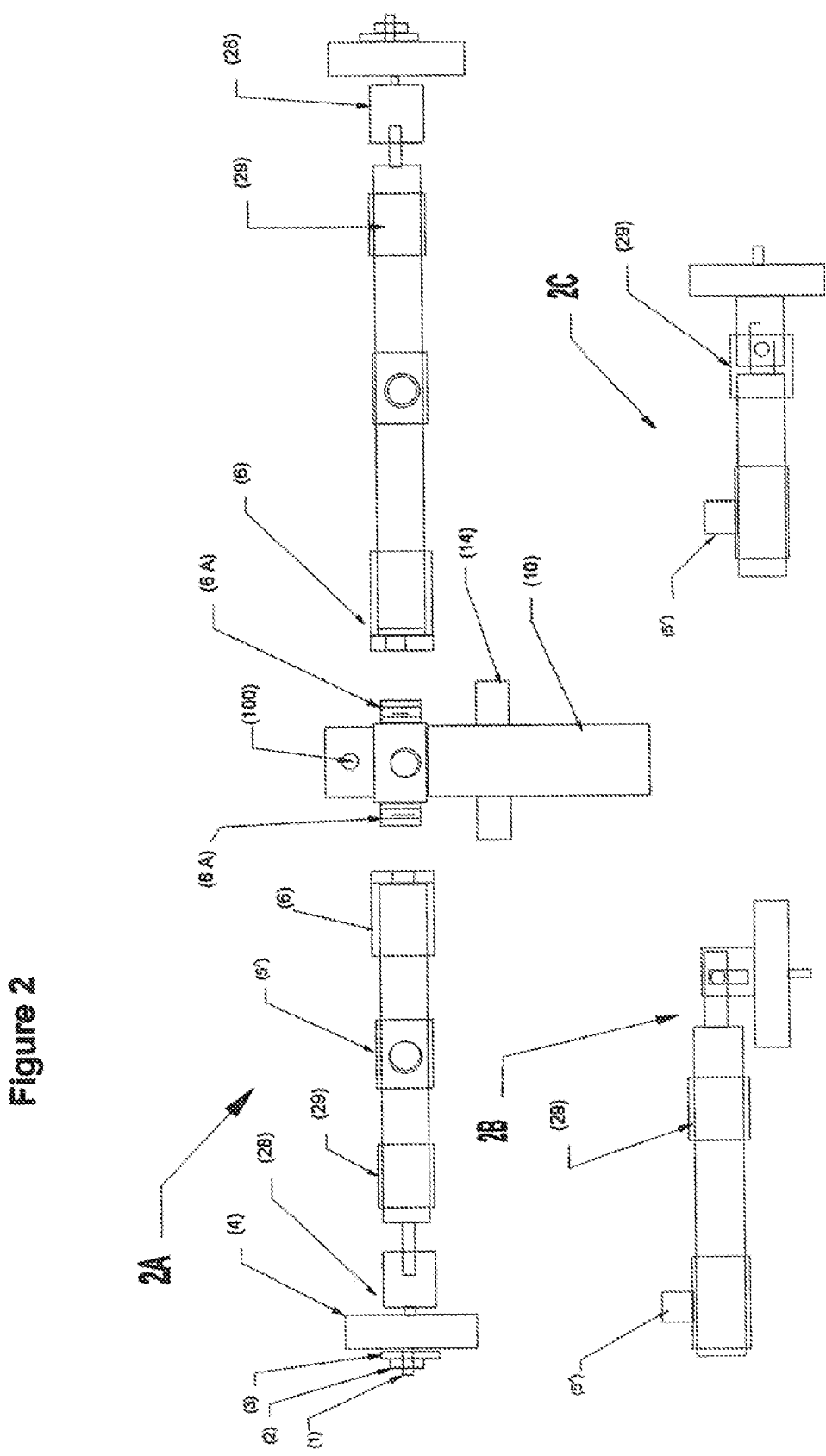
FIG. 2A is a schematic chart of a separable and/or foldable embodiment of a roll sprinkler according to the invention. 2B illustrates a folded position of the apparatus and 2C shows the unfolded position.
Figure 3:
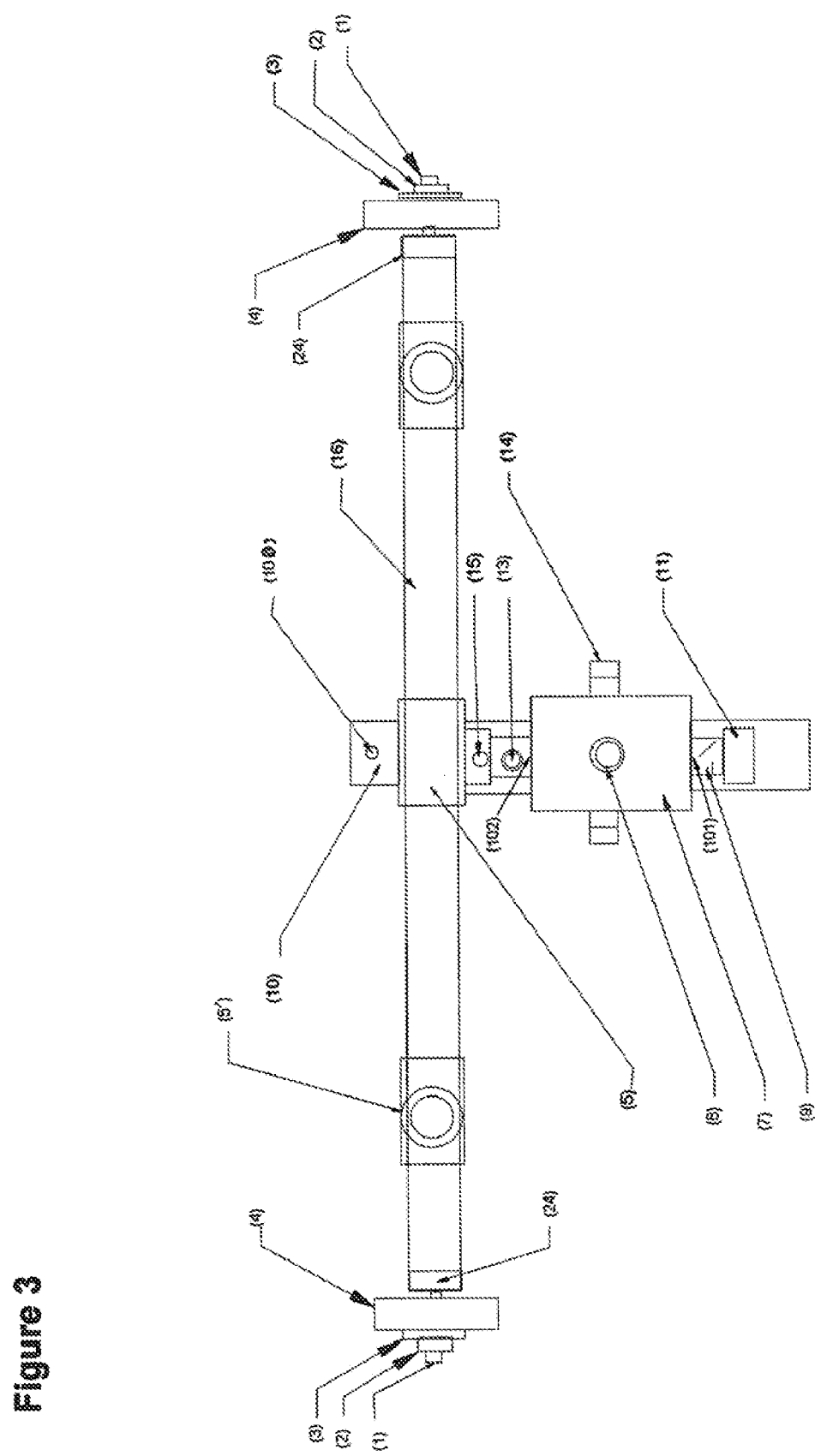
FIG. 3 is a vertical view of an embodiment with one chemical tank.

The Roll-Sprinkler system can be separatable and/or foldable. FIG. 2 shows configurations that can be easily separated in to two or three section by disconnecting the line coupler [6]. It can also be foldable by releasing the wheel lock 29 and turning the connecting parts 28 along the pivot pin 30, as shown in 2B. This will allow for the sprinkling system to be easily packaged for shipment and for convenient storage within limited space.

In one of the embodiment, the roll-sprinkling system may has a single tank, which is the inboard closed portion which serves as a mixing chamber for the fertilizer or detergent. The horizontal outboard pipe portion [16] is linked with the mixing chamber via the control valve [15] and linked with a horizontal T-shaped three way link [5]. The water will be forced to go directly to the mixing camber #[7] from the main water line intake adaptor [11] and mix with the chemical, and continue through control valve #[15] to the out board delivery line [16], to be sprayed out through the sprinkler head. The back wash is restricted from contaminating the inboard water supply by one way valve [9] located at the main water line connection [11]. The multi head sprinklers are positioned at the outboard portion of the pipe system mounted vertically to a horizontal pipe which is linked with wheels for an easy way of displacing the system during irrigation.

This embodiment also provides a car washing outlet for the car washing/waxing functions. The chemicals in the tank can be fertilizer, weedicide, pesticide for irrigation purposes, or it can be detergent, waxing agent, or protective for the car finishing.

Figure 4:
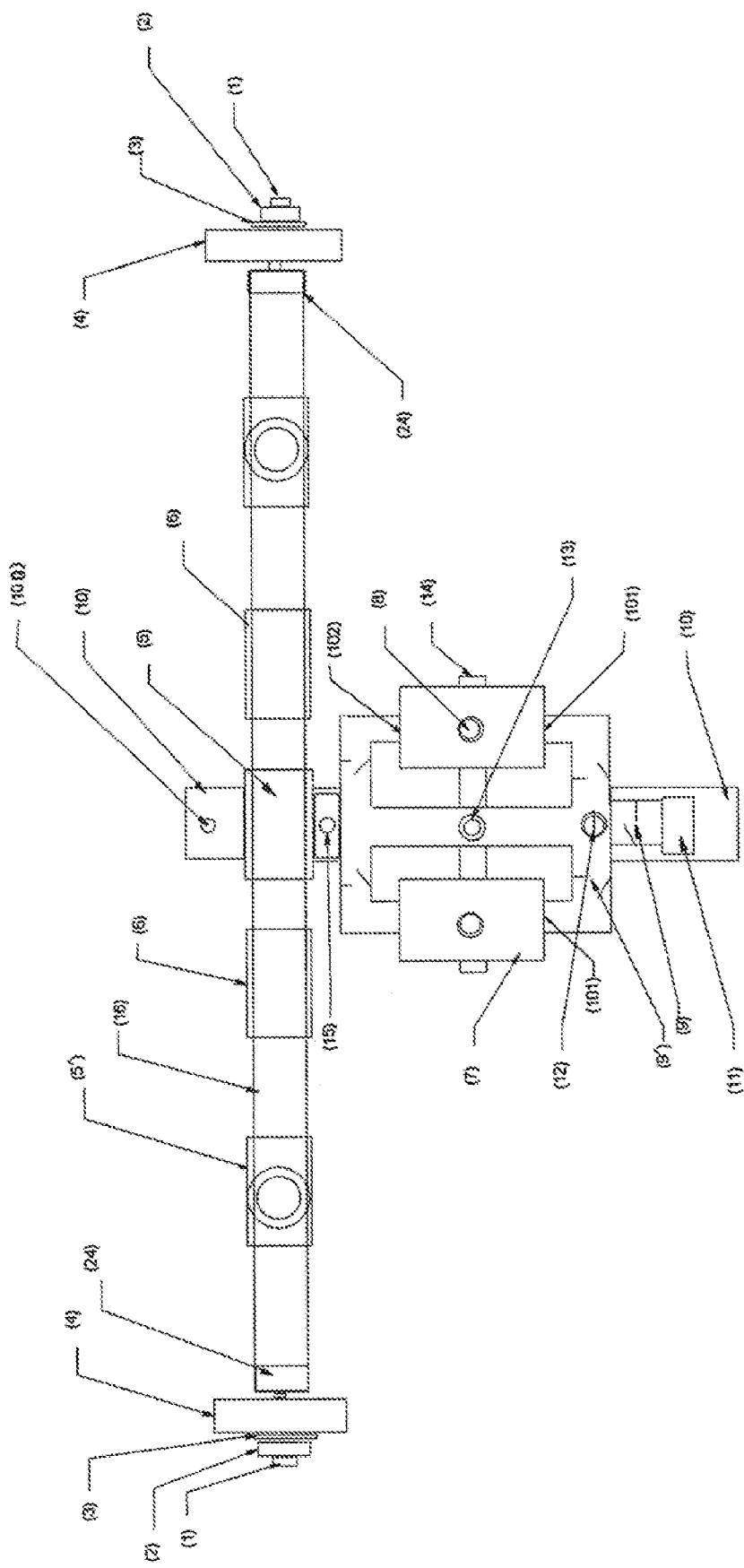
FIG. 4 is a vertical view of an embodiment with multiple chemical tanks.

Another embodiment of the roll sprinkler assembly shown in FIG. 4 is a multi head sprinkler system with multiple chemical tanks. It has a three way valve [12] to direct the incoming liquid to Left or Right tanks, which are the inboard closed portion which contains the fertilizer or other chemicals. The valve system allows the user to activate the car wash line with the combination of one way valve #[9] and control valve #[15] and wash hose adaptor [13]. The outboard pipe portion is controlled by the one way valve #[9] and combination of the three way controller valve #[12] for the mixed liquid to go the sprinkler heads, or to the car wash adaptor head only with the combination of valves [12] and [15]. There are four one way valves located at each inboard and out board section of the tanks, which will enable the user to select and use a specific mixed product at a time. This embodiment is constructed with a horizontal pipe system as the main frame with wheels for liquid to flow through and out through the sprinkler heads for irrigations.

In operation, the outboard pipe portion [16] is linked to the mixing chamber via the control valve [15] with horizontal T-shaped three way threaded link #[5]. The water will be forced to go directly to either mixing chamber [7] from the main water line intake [11] and mix with the chemicals, and continue through control valve [15] to the out board pipe [16], to be sprayed out through the sprinkler head. The back wash is restricted from contaminating the inboard water supply by one way valve [9] connecting the main water line inlet adaptor [11].

The two chemical tanks are the inboard closed portion which serves as a mixing chamber for the fertilizer or detergent. It allows the user to choose the chemicals for the irrigating water or for car washing function. The embodiment also provides a simultaneous mixing system for multiple applications of chemicals. This can be done by a separate valve for each tank, with independent adjustable controls for directing incoming water to the respective chemical tank.

Figure 5:
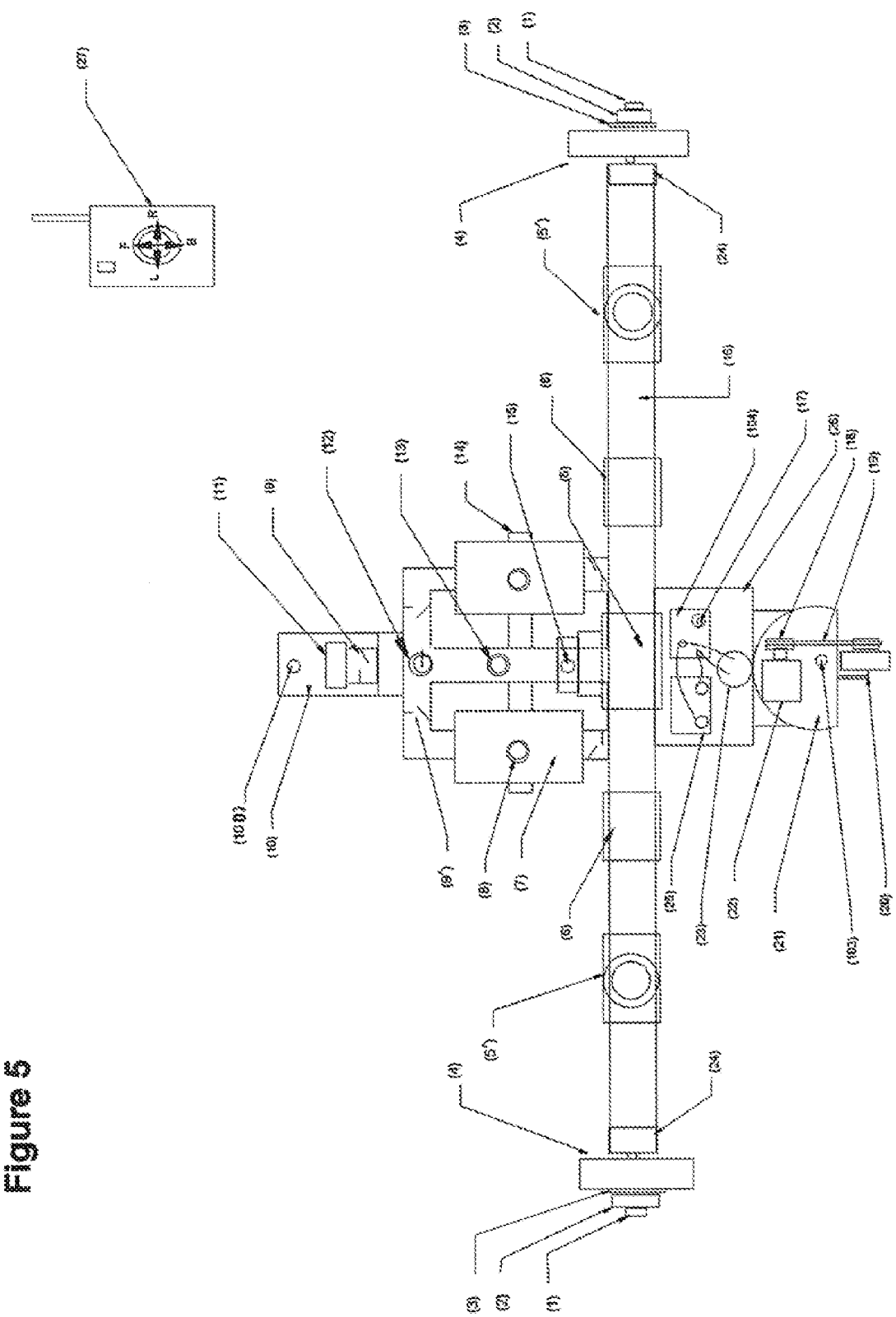
FIG. 5 is a vertical view of an embodiment with multiple chemical tanks and driving wheel system having directional control via remote controller.

A more comprehensive embodiment is shown in FIG. 5. This sprinkler system is constructed with a horizontal pipe system with multiple chemical tanks and driving/directing wheels. The system is composed of an opening adaptor [11] for allowing the system to connect with standard garden hoes. It also has a three way valve to control the function required #[12] to direct the incoming liquid to Left or Right tanks, which are the inboard closed portion which contains chemicals. The valve allows the user to activate the car wash line with the combination of one way valve [9] and control valve [5] and Wash hose adaptor #[13]. The out board pipe portion is controlled by the one way valve [9] and a combination of the three way controller valve [12] for the mixed liquid to go the sprinkler heads, or to the car wash adaptor head only when the combination of [12] and [15] is used. There are four one way valves located at each inboard and out board section of the tanks [9], which will enable the user to select one of the tanks, and use a specific mixed product at a time.

The multi head sprinklers are mounted vertically to a horizontal pipe system which is linked with wheels for easy displacing of the system during irrigation.

In operation, the out board pipe portion [16] is linked with the mixing chamber via the control valve [15] with horizontal "T" three way threaded link [5]. The water will be forced to go directly to the mixing chambers [7] from the main water line intake [11] and mix with the chemicals, and continue through control valve [15] to the out board delivery line [16], to be sprayed out through the sprinkler head. The back wash is restricted from contaminating the main inboard water supply by one way valve [9] connecting the main water line adaptor [11].

This embodiment may be powered by DC battery [25] and controlled by the onboard RF receiver module [17], which is mounted on the fixed bracket platform [26]. The RF receiver module controls the directional motor [23] which is mounted on the fixed platform and the driving motor [22]. The direction motor rotates the pivoting platform [21] on which the driving motor [22] and the powered wheel is mounted. The RF receiver is controlled by a hand held remote controller [27] which will be powered by DC batteries.

This embodiment may be alternatively controlled by programmable IC chips, pre-programmed with designed route and combination of the chemicals for automated irrigation.

As will be appreciated by one of skill in the art, aspects of the invention can be applied to other embodiments of the roll sprinkler system. It will of course be understood that the invention is not limited to the specific details described herein, which are given by way of example only, and that various modifications and alterations are possible within the scope of the invention as defined in the claims.

An index for the numerical indicators in the figures is provided as follows.

| | |
|---|---|
| [1] | Wheel axis |
| [2] | Lock Bolt |
| [3] | Washer |
| [4] | Wheel |
| [5] | Horizontal "T" three way pipe link |
| [5'] | Vertical "T" three way pipe link |
| [6] and [6A] | Outboard line coupler |
| [7] | Chemical Tank |

-continued

| | |
|---|---|
| [8] | Cap for chemical tanks |
| [9] | Main one way valve |
| [9'] | Inlet one way valve for chemical tank |
| [10] | Platform plate |
| [11] | Garden Hose adaptor |
| [12] | Multiple-way valve |
| [13] | Car wash hose outlet |
| [14] | Tank retaining bracket |
| [15] | Outboard water valve |
| [16] | Outboard pipe line |
| [17] | RF receiver module |
| [18] | Driving gear |
| [19] | Driving Chain |
| [20] | Driving/directing wheel |
| [21] | Pivoting platform |
| [22] | Driving motor |
| [23] | Directional motor |
| [24] | Connecting pipe for wheel |
| [25] | DC battery |
| [26] | Fixed platform |
| [27] | Remote controller |
| [28] | Wheel connector |
| [29] | Wheel position lock |
| [30] | Wheel pivot pin |
| [100] | Hole on the platform plate |
| [101] | First opening of the chemical tank |
| [102] | Second opening of the chemical tank |
| [103] | Pivot |
| [104] | Controlling module |

What is claimed is:

1. A roll-sprinkler apparatus comprises:
   a horizontal water conducting pipe system having two pipe portions each having an inward end and an outward end;
   a horizontal T-shaped three-way connector having two through ends and a perpendicular end, connecting the two inward ends of the two pipe portion via its through ends;
   an inlet adaptor connected to the perpendicular end of the horizontal T-shaped three-way connector for allowing the pipe system to link with a standard garden hose;
   two vertical T-shaped three-way connectors each having two through ends and a perpendicular end, each connected to one of the outward ends of the pipe portions via one of the through ends, said
   perpendicular end of the vertical T-shaped three-way connectors is adapted to connect conventional sprinkler head;
   two horizontal connecting means which do not conduct water, each fixed to a remaining through end of each vertical T-shaped three way connector;
   two wheels each connected to the pipe system along the horizontal axis by the two connecting means; and
   a horizontal platform plate with holes fixed to the horizontal T-shaped three-way connector, extending perpendicularly with respect to the pipe portion.

2. The roll-sprinkler apparatus according to claim 1, further including a separable configuration comprising:
   two separable line couplers each linking one of the though ends of the horizontal T-shaped three-way connector with the inward ends of each of the pipe portions.

3. The roll-sprinkler apparatus according to claim 1, where the two connecting means are foldable.

4. The roll-sprinkler apparatus according to claim 1, further comprising:
   a one-way main valve connected to the inlet adaptor;
   a chemical tank having a first opening and a second opening, said chemical tank is connected with the one-way main valve via said first opening;
   a control valve connecting the second opening of the chemical tank with the horizontal T-shaped three-way connector; and
   a tank retaining bracket fixed on the platform plate for keeping the chemical tank in position.

5. The roll-sprinkler apparatus according to claim 4, further comprising:
   a car wash hose outlet positioned between the second opening of the chemical tank and the control valve.

6. The roll-sprinkler apparatus according to claim 1, further comprising:
   a one-way main valve connected to the inlet adaptor;
   a multiple way valve connected to the main valve;
   a set of multiple chemical tanks having first and second openings;
   a one-way valve connected to each of the first openings of each chemical tank;
   said multiple-way valve connected to each of the one-way valves;
   a control valve connecting the second opening of the chemical tank to the horizontal T-shaped three-way connector; and
   a tank retaining bracket fixed on the platform plate for keeping the chemical tanks in a fixed position.

7. The roll-sprinkler apparatus according to claim 6, further comprising:
   a car wash hose outlet positioned between the multiple-way adaptor and the control valve.

8. The roll-sprinkler apparatus according to claim 1, further comprises:
   a driving wheel fixed to the platform plate;
   a driving motor mounted on the platform plate coupled with the driving wheel; and
   an electric source connector positioned on the platform plate.

9. The roll-sprinkler apparatus according to claim 1, further comprising:
   a pivoting platform fixed with a pivot and connected to the platform plate through the pivot;
   a directing/driving wheel fixed to the pivoting platform;
   a driving motor mounted on the platform plate coupled with the driving/directing wheel;
   a directional motor mounted on the platform plate, coupled with the pivoting platform;
   an electric source connector positioned on the platform plate; and
   a controlling module connected with the electric source controlling the driving motor and the directional motor, mounted on the platform plate.

10. The roll-sprinkler apparatus according to claim 9, further comprising,
    an IC chip coupled with the controlling module, which can be programmed for the sprinkling route.

11. The roll-sprinkler apparatus according to claim 9, further comprising,
    a RF receiver coupled with the controlling module for remote control of the driving motor and the directional motor.

12. The roll-sprinkler apparatus according to claim 1, further comprising,
    each of the pipe portions comprises a number of segment pipes; and
    a number of vertical T-shaped three-way connectors, each connecting to the segment pipes via the through ends.

* * * * *